US011012297B2

(12) United States Patent
Stoicov et al.

(10) Patent No.: US 11,012,297 B2
(45) Date of Patent: May 18, 2021

(54) METHODS AND APPARATUS TO MIGRATE PHYSICAL SERVER HOSTS BETWEEN VIRTUAL STANDARD SWITCHES AND VIRTUAL DISTRIBUTED SWITCHES IN A NETWORK

(71) Applicant: VMware, Inc., Palo Alto, CA (US)

(72) Inventors: Boris Dimitrov Stoicov, Sofia (BG); Christian Dickmann, Niestetal (DE)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 15/954,187

(22) Filed: Apr. 16, 2018

(65) Prior Publication Data
US 2019/0319837 A1 Oct. 17, 2019

(51) Int. Cl.
H04L 12/24 (2006.01)
(52) U.S. Cl.
CPC .......... *H04L 41/0813* (2013.01); *H04L 41/22* (2013.01)
(58) Field of Classification Search
CPC ....... G06F 9/45558; G06F 2009/45595; G06F 2009/4557; G06F 11/00; G06F 11/3604; G06F 3/0647; G06F 9/4856; G06F 15/177; G06F 9/5088; G06N 5/022; H04L 67/10; H04L 47/20; H04L 67/32; H04L 67/30; H04L 67/34; H04L 41/0806; H04L 41/22; H04L 41/0893; H04L 41/0803; H04L 41/0813; H04L 41/0869; H04L 41/08; H04L 41/0886; H04L 41/12; H04L 41/0823; H04L 41/0873
USPC ................................................ 709/220, 221
See application file for complete search history.

(56) References Cited

U.S. PATENT DOCUMENTS

| 10,248,671 B2* | 4/2019 | Buehne | G06F 16/119 |
| 2003/0078957 A1* | 4/2003 | Cheeniyil | G06Q 10/10 709/201 |
| 2009/0154709 A1* | 6/2009 | Ellison | G06F 21/51 380/282 |

(Continued)

OTHER PUBLICATIONS

VMware; VMware vNetwork Distributed Switch: Migration and Configuration; Aug. 11, 2009; p. 1-37 (Year: 2009).*
VMware, "Create a vSphere Distributed Switch," VMware vSphere, Mar. 20, 2018, retrieved from the Internet [https://docs.vmware.com/en/VMware-vSphere/6.5/com.vmware.vsphere.networking.doc/GUID-D2163241-0AC9-437C-80B1-0C8043CC1D7D.html], (2 pages).

(Continued)

*Primary Examiner* — Tonia L Dollinger
*Assistant Examiner* — Linh T. Nguyen
(74) *Attorney, Agent, or Firm* — Hanley, Flight & Zimmerman, LLC

(57) ABSTRACT

An example apparatus to migrate a physical server host from a virtual standard switch to a virtual distributed switch includes: a user input interface to receive a user-selection of first physical network interface cards of a first physical server host to migrate from the virtual standard switch to the virtual distributed switch; a configurator to generate a first migration plan to configure the virtual distributed switch using network configuration settings of the virtual standard switch corresponding to the first physical network interface cards; and a virtual distributed switch creator to, based on a user-selection to proceed with the migration from the virtual standard switch to the virtual distributed switch, create the virtual distributed switch in the first physical server host and a second physical server host, the configurator to configure the network configuration settings of the virtual standard switch in the virtual distributed switch.

20 Claims, 9 Drawing Sheets

(56) References Cited

U.S. PATENT DOCUMENTS

| | | | | |
|---|---|---|---|---|
| 2009/0292858 A1* | 11/2009 | Lambeth | ................ | G06F 12/08 |
| | | | | 711/8 |
| 2011/0283278 A1* | 11/2011 | Murrell | ..................... | G06F 9/55 |
| | | | | 718/1 |
| 2013/0097296 A1* | 4/2013 | Gehrmann | ............ | G06F 9/4856 |
| | | | | 709/223 |
| 2013/0308492 A1* | 11/2013 | Baphna | ................... | H04L 12/28 |
| | | | | 370/254 |
| 2014/0133358 A1* | 5/2014 | Yin | ......................... | H04L 12/24 |
| | | | | 370/254 |
| 2015/0264128 A1* | 9/2015 | Huang | ................ | H04L 67/1014 |
| | | | | 709/203 |
| 2016/0182296 A1* | 6/2016 | Sharp-Paul | ............. | H04L 12/24 |
| | | | | 709/224 |
| 2018/0034856 A1* | 2/2018 | Mallya | ..................... | H04L 63/10 |

OTHER PUBLICATIONS

VMware, "Existing UI Wizard Walkthrough: Create DVS," VMware vSphere Web Client, version 5.5—Screenshots, 2013, 8 pages.
VMware, "Configure Distributed Switch for vSAN," VMware vSphere, Jul. 14, 2017, 2 pages.
VMware, "Use a Host as a Template to Create a Uniform Networking Configuration on a vSphere Distributed Switch in be vSphere Web Client," VMware Sphere, Feb. 1, 2017, 3 pages.
VMware, "Functionality Updates for the vSphere Client," VMware vSphere, Mar. 12, 2019, 18 pages.
VMware, "Administering VMware vSAN," Oct. 4, 2017, 182 pages.

* cited by examiner

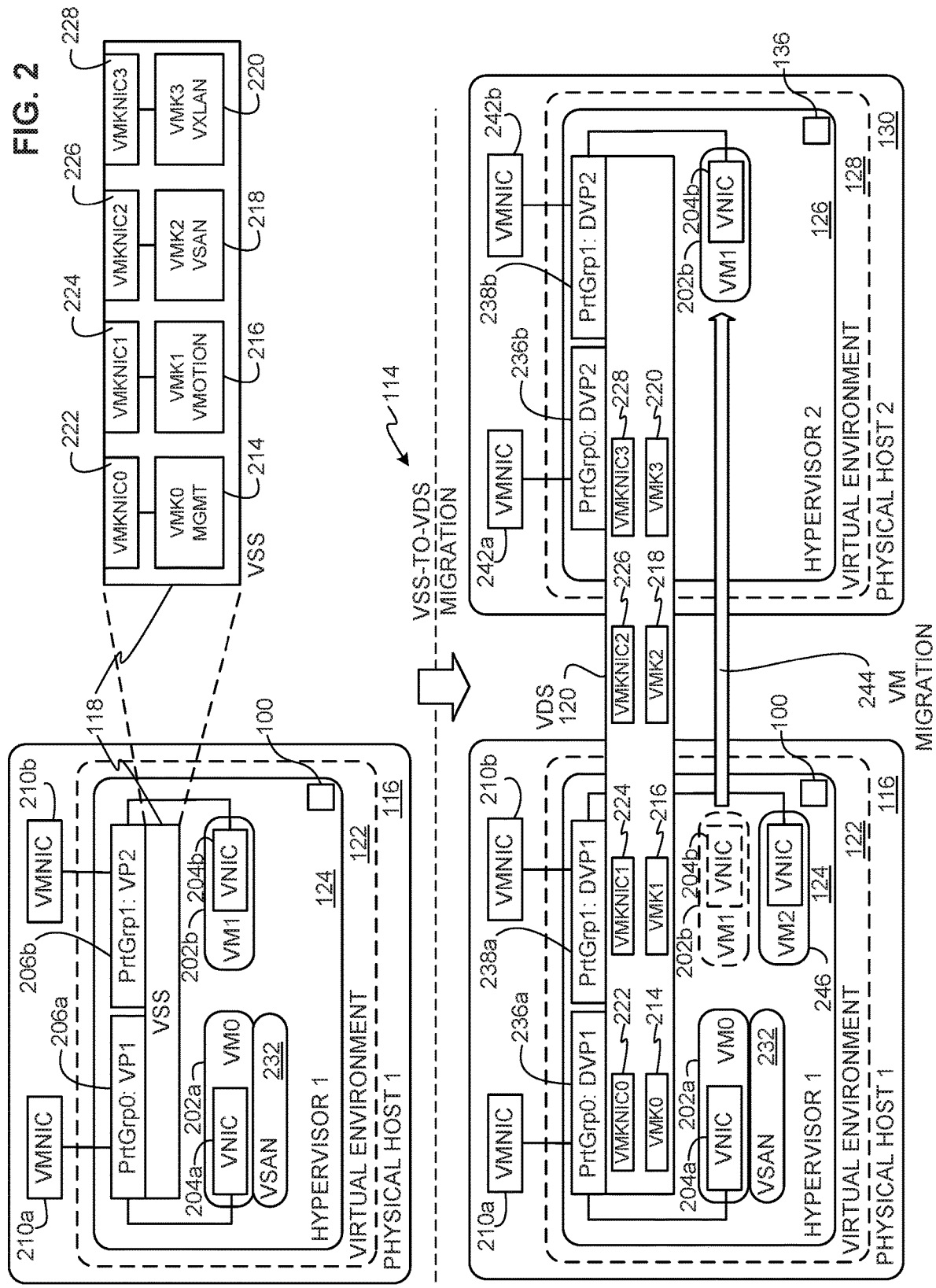

FIG. 3

CLS – NEW DISTRIBUTED SWITCH FOR A vSAN

1 NAME AND TYPE
2 READY TO COMPLETE

NAME AND TYPE
FILL IN THE NAME AND CHOOSE WHETHER TO CREATE A NEW SWITCH OR MIGRATE EXISTING STANDARD SWITCH FROM THE HOSTS IN THE CLUSTER

NAME: cls-vSAN-VDS — 302

TYPE: CREATE NEW VDS — 304
MIGRATE EXISTING VSS

ADDITIONALLY, SELECT WHICH UNUSED ADAPTERS TO MIGRATE TO THE NEW DISTRIBUTED SWITCH

| PHYSICAL NETWORK ADAPTER / HOST | ACTUAL SPEED | CONFIGURED... | IN USE BY SWITCH |
|---|---|---|---|
| ☐ VMNIC1 | | | |
| ☑ 10.26.235.91 | 1000 MB | AUTO NEGOTIATE | UNUSED |
| ☑ 10.26.235.208 | 1000 MB | AUTO NEGOTIATE | UNUSED |
| ☑ 10.26.235.66 | 1000 MB | AUTO NEGOTIATE | UNUSED |
| ☐ VMNIC3 | | | |
| ☑ 10.26.235.91 | 1000 MB | AUTO NEGOTIATE | UNUSED |
| ☑ 10.26.235.208 | 1000 MB | AUTO NEGOTIATE | UNUSED |
| ☑ 10.26.235.66 | 1000 MB | AUTO NEGOTIATE | UNUSED |
| ☐ VMNIC2 | | | |
| ☑ 10.26.235.91 | 1000 MB | AUTO NEGOTIATE | UNUSED |
| ☑ 10.26.235.208 | 1000 MB | AUTO NEGOTIATE | UNUSED |
| ☑ 10.26.235.66 | 1000 MB | AUTO NEGOTIATE | UNUSED |

FIND

12 ITEMS  EXPORT▼  COPY▼

BACK  NEXT  FINISH  CANCEL

CLS – NEW DISTRIBUTED SWITCH FOR vSAN

1 NAME AND TYPE
2 MIGRATE INFRASTRUCTURE VMs
3 READY TO COMPLETE

NAME AND TYPE
FILL IN THE NAME AND CHOOSE WHETHER TO CREATE A NEW SWITCH OR MIGRATE EXISTING STANDARD SWITCH FROM THE HOSTS IN THE CLUSTER

NAME: cls-vSAN-VDS

TYPE: MIGRATE vSwitch0

ADDITIONALLY, SELECT WHICH UNUSED ADAPTERS TO MIGRATE TO THE NEW DISTRIBUTED SWITCH:

| | PHYSICAL NETWORK ADAPTER / HOST | ACTUAL SPEED | CONFIGURED… | IN USE BY SEARCH |
|---|---|---|---|---|
| ☑ | VMNIC0 | | | |
| | 10.26.235.91 | 1000 MB | AUTO NEGOTIATE | vSwitch0 |
| | 10.26.235.208 | 1000 MB | AUTO NEGOTIATE | vSwitch0 |
| | 10.26.235.66 | 1000 MB | AUTO NEGOTIATE | vSwitch0 |
| ☐ | VMNIC1 | | | |
| | 10.26.235.91 | 1000 MB | AUTO NEGOTIATE | vSwitch0 |
| | 10.26.235.208 | 1000 MB | AUTO NEGOTIATE | UNUSED |
| | 10.26.235.66 | 1000 MB | AUTO NEGOTIATE | UNUSED |
| ☐ | VMNIC3 | | | |
| | 10.26.235.91 | 1000 MB | AUTO NEGOTIATE | UNUSED |
| | 10.26.235.208 | 1000 MB | AUTO NEGOTIATE | UNUSED |
| | 10.26.235.66 | 1000 MB | AUTO NEGOTIATE | UNUSED |
| ☐ | VMNIC2 | | | |
| | 10.26.235.91 | 1000 MB | AUTO NEGOTIATE | UNUSED |
| | 10.26.235.208 | 1000 MB | AUTO NEGOTIATE | UNUSED |
| | 10.26.235.66 | 1000 MB | AUTO NEGOTIATE | UNUSED |

FIND                    16 ITEMS  EXPORT ▼  COPY ▶

[ BACK ]  [ NEXT ]  [ FINISH ]  [ CANCEL ]

FIG. 4

CLS -- NEW DISTRIBUTED SWITCH FOR vSAN

✓ 1 NAME AND TYPE
2 MIGRATE INFRASTRUCTURE VMs
3 READY TO COMPLETE

MIGRATE INFRASTRUCTURE VMs
VIRTUAL MACHINE RUNNING vCenter HAS BEEN DETECTED ON THE SWITCH. TO FULLY AUTOMATE THE SWITCH MIGRATION, PLEASE SELECT ADDITIONAL VIRTUAL MACHINES THAT REQUIRE SPECIAL ATTENTION WHEN MIGRATING THEIR NETWORK

FILTER (0) SELECTED OBJECTS

| NAME | STATE | STATUS | HOST | IP ADDRESS |
|---|---|---|---|---|
| ☐ TEST VM | POWEREDOFF | GREEN | 10.26.235.66 | |

🔍 FIND

1 ITEMS 📋 COPY ▼

BACK | NEXT | FINISH | CANCEL

CLS -- NEW DISTRIBUTED SWITCH FOR vSAN

✓ 1 NAME AND TYPE
✓ 2 MIGRATE INFRASTRUCTURE VMs
3 READY TO COMPLETE

READY TO COMPLETE
REVIEW YOUR SELECTIONS BEFORE COMPLETING THE WIZARD.

VDS NAME: cls-vSAN-VDS
TYPE: MIGRATE vSwitch0
UNUSED ADAPTERS TO MIGRATE: vmnic1

PRE-MIGRATION VALIDATION

| MIGRATION TEST | RESULT | DETAILS |
|---|---|---|
| MIGRATING VM NETWORK | ⊘ PASSED | THE PORT GROUP WILL BE MIGRATED AND ALL HOSTS ATTACHED APPROPRIATELY |
| | | 10.26.235.91 |
| | | 10.26.235.208 |
| | | 10.26.235.66 |
| MIGRATING MANAGEMENT NETWORK | ⊘ PASSED | THE PORT GROUP WILL BE MIGRATED AND ALL HOSTS ATTACHED APPROPRIATELY |
| | | 10.26.235.91 |
| | | 10.26.235.208 |
| | | 10.26.235.66 |

🔍 FIND                8 ITEMS   ⬆ EXPORT ▼   📋 COPY ▼

[ BACK ] [ NEXT ] [ FINISH ] [ CANCEL ]

FIG. 6

METHODS AND APPARATUS TO MIGRATE PHYSICAL SERVER HOSTS BETWEEN VIRTUAL STANDARD SWITCHES AND VIRTUAL DISTRIBUTED SWITCHES IN A NETWORK

FIELD OF THE DISCLOSURE

The present disclosure relates generally to network-based computing and, more particularly, to methods and apparatus to migrate physical server hosts between virtual standard switches and virtual distributed switches in a network.

BACKGROUND

Virtualizing computer systems provides benefits such as the ability to execute multiple computer systems on a single hardware computer, replicating computer systems, moving computer systems among multiple hardware computers, and so forth. Virtual computing environments enable developers to build, deploy, and manage applications at a greater scale and at a faster pace than before. Virtual computing environments may be composed of many processing units (e.g., physical server hosts). The processing units may be installed in standardized frames, known as racks, which provide efficient use of floor space by allowing the processing units to be stacked vertically. The racks may additionally include other components of a virtual computing environment such as storage devices, networking devices (e.g., switches), etc. Physical server hosts are networked with one another to enable communications between virtual machines running on the physical server hosts and communications with other devices.

BRIEF DESCRIPTION OF THE DRAWINGS

FIG. 2 shows additional details of the example physical server host of FIG. 1 migrated from the VSS network switch to the VDS network switch of FIG. 1 in accordance with teachings of this disclosure.

FIG. 3 illustrates an example migration selection graphical user interface (GUI) to enable a user to specify a migration from a VSS network switch to a VDS network switch.

FIG. 4 illustrates an example network adapter selection GUI to enable a user to specify network adapters to migrate to a VDS network switch.

FIG. 5 illustrates an example migrate infrastructure/management virtual machine (VM) selection GUI to enable a user to select one or more infrastructure/management VMs to migrate from a VSS network switch to a VDS network switch.

FIG. 6 illustrates an example pre-migration validation GUI to show whether a VSS-to-VDS migration plan is valid.

Figure 1:
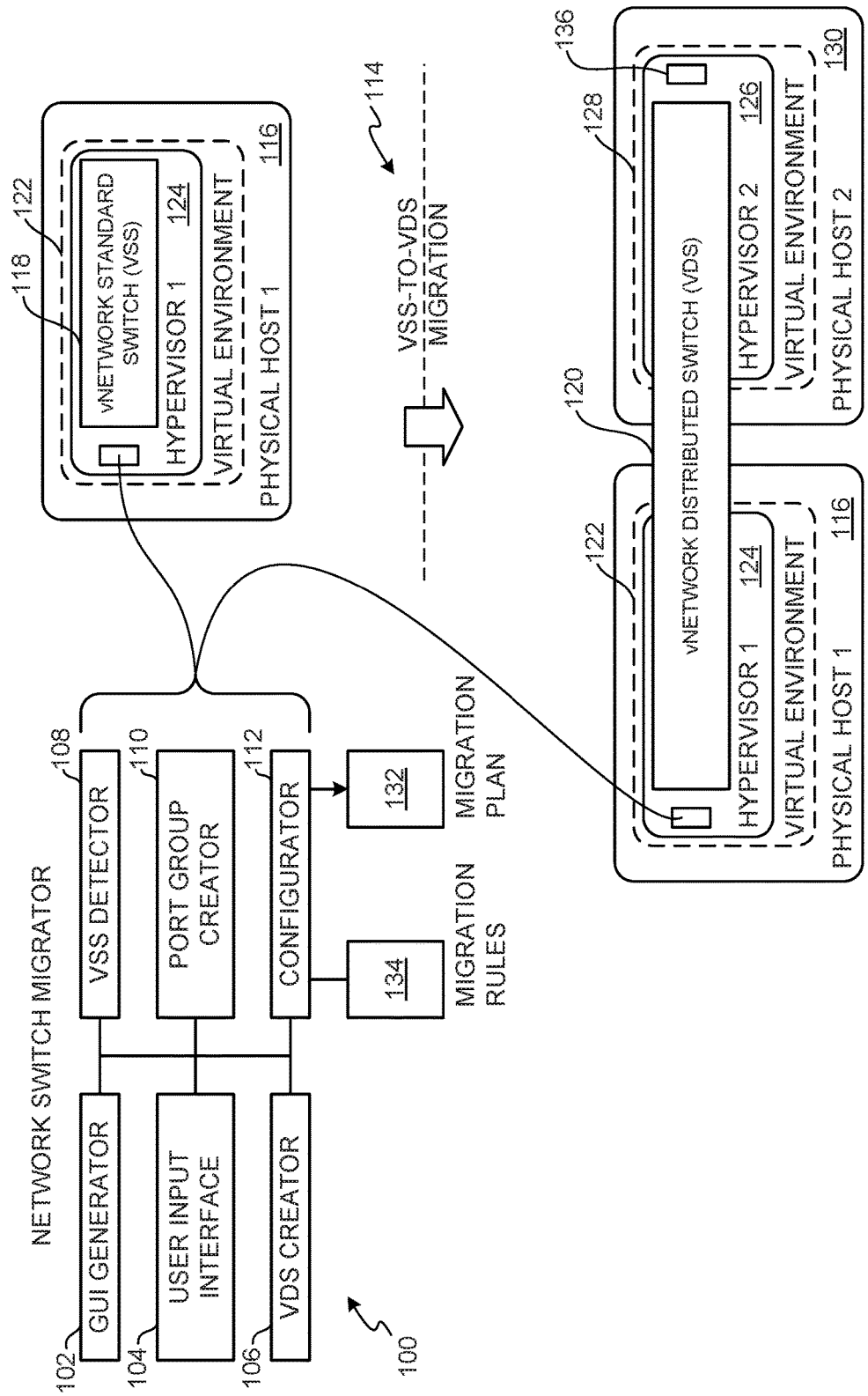
FIG. 1 is an example network switch migrator to migrate a physical server host from a virtual standard switch (VSS) to a virtual distributed switch (VDS).

Wherever possible, the same reference numbers are used throughout the drawing(s) and accompanying written description to refer to the same or like parts. Connecting lines or connectors shown in the various figures presented are intended to represent example functional relationships and/or physical or logical couplings between the various elements.

DETAILED DESCRIPTION

Methods and apparatus disclosed herein migrate physical server hosts between virtual standard switches and virtual distributed switches in a network. In virtual computing environments, physical server hosts execute hypervisors to create virtual environments to run virtual machines (VMs). In addition, VMs are provided with network connectivity by instantiating virtual network switches via which the VMs can perform network communications. Two example types of virtual network switches are a virtual standard switch (VSS) and a virtual distributed switch (VDS). A VSS is a type of virtual network switch that is instantiated in a single hypervisor of a single physical server host for use only by VMs that execute on that hypervisor of that physical server host. A VDS is a type of virtual network switch that is instantiated across multiple hypervisors of multiple physical server hosts for use by VMs running on any one or more of those hypervisors of the multiple physical server hosts. As such, VSS network switches are isolated for use by same-host VMs while VDS network switches can flexibly be used by VMs across multiple hosts.

An advantage of VDS network switches is that a cluster of physical server hosts can be assigned to the same VDS network switch. As such, VMs across multiple physical server hosts can be grouped to use the same network configurations even though such VMs run on separate physical server hosts. This is useful when making the same network configuration changes for multiple VMs that reside in different physical server hosts. For example, when using a VDS network switch, because a cluster of physical server hosts can be assigned to the same VDS network switch that is instantiated across the multiple physical server hosts, network configuration changes that affect multiple VMs across the separate physical server hosts need only be entered once into the single VDS network switch to take effect for all VMs across the multiple hosts. However, when using separate instantiations of VSS network switches in separate physical server hosts, making the same network configuration changes across the VMs requires applying such changes multiple times by entering the change repeatedly across all the VSS network switches. This can be a time-consuming and cumbersome process.

Due to the network configuration advantages of using VDS network switches, enterprises running virtual computing environments sometimes elect to migrate physical server hosts from VSS network switches to VDS network switches. Prior techniques for performing such migrations are tedious as they involve a significant number of steps so that newly instantiated VDS network switches contain the same network configurations of VSS network switches from which physical server hosts are being migrated. For example, the process of creating a VDS and migrating physical server hosts from their VSS to the new VDS is long, includes many repetitive small tasks, and contains many details which makes such process unclear and highly susceptible to errors.

Examples disclosed herein enable users to create a VDS network switch and distributed port groups to migrate physical server hosts ("hosts") of a cluster to the newly created VDS from VSS network switches in a shorter amount of time and using less-complex user involvement than prior techniques. Examples disclosed herein determine whether user-specified hosts have the same network configuration for their VSS network switches and offer to migrate the same network configuration to the newly created VDS network switch. Examples disclosed herein also create distributed port groups on the VDS network switch so that all the proper configurations can be made to different port groups for corresponding VMs connected to those port groups. In this manner, clusters of hosts in those port groups can continue to operate in the newly created VDS network switch as before when such clusters of hosts used respective VSS network switches. Examples disclosed herein also provide special handling of infrastructure/management VMs by ensuring that management settings remain the same so that such infrastructure/management VMs continue to run as expected. In examples disclosed herein, infrastructure/management VMs are VMs that run management processes to virtualize components of a physical server host and manage those virtualized components. Example infrastructure/management VMs may virtualize processor, memory, storage, and networking resources into logical resources and manage such logical resources.

FIG. 1 is an example network switch migrator 100 that includes an example graphical user interface (GUI) generator 102, an example user input interface 104, an example virtual distributed switch (VDS) creator 106, an example virtual standard switch (VSS) detector 108, an example port group creator 110, and an example configurator 112. The example network switch migrator 100 implements a VSS-to-VDS migration 114 to migrate a physical server host 116 from using an example VSS network switch 118 to using an example VDS network switch 120. In the illustrated example, the physical server host 116 is a processor system used to implement a virtual computing environment 122 and may be implemented using the example processor platform 800 of FIG. 8. In some examples, the physical server host 116 is part of a cluster of physical server hosts used in a virtual computing environment. In some examples, the cluster of physical server hosts is in a single physical rack. In other examples, the physical server hosts of the cluster are located across multiple physical racks. In some examples, the cluster is implemented as a vCenter ESXi™ cluster which is a group of physical servers that run ESXi™ hypervisors (developed and sold by VMware, Inc.) to virtualize processor, memory, storage, and networking resources into logical resources to run multiple VMs that run operating systems (OSs) and applications as if those OSs and applications were running on physical hardware without an intermediate virtualization layer. An example vCenter ESXi™ cluster may be instantiated and managed using VMware vCenter® virtual infrastructure server software developed and sold by VMware, Inc. Alternatively, examples disclosed herein may be used with clusters implemented using other cluster management software.

The example virtual computing environment 122 ("the virtual environment 122") is a virtualization layer implemented by executing an example hypervisor 124 in the physical server host 116. The example hypervisor 124 may be implemented using an ESXi™ hypervisor. In other examples, other hypervisors may additionally or alternatively be used to implement the virtual environment 122. Example hypervisors that may be used to implement the virtual environment 122 include Type 1 hypervisors (e.g., bare metal hypervisors) that run on a processor system without an underlying host OS and Type 2 hypervisors that run on an intermediate host OS executing on a processor system. The virtual environment 122 of the illustrated example, and its associated components are configured to run VMs. However, in other examples, the virtual environment 122 may additionally, and/or alternatively, be configured to run containers. For example, the virtual environment 122 may be used to deploy a VM as a data computer node with its own guest OS on a host using resources of the host. Additionally or alternatively, the virtual environment 122 may be used to deploy a container as a data computer node that runs on top of a host OS without the need for a hypervisor or separate OS.

The network switch migrator 100 of the illustrated example is executed in the hypervisor 124. For example, the network switch migrator 100 may be implemented in a VM executing on the hypervisor 124. In some examples, the network switch migrator 100 is implemented in a vCenter® server (developed and sold by VMware, Inc.) that runs on a VM executing on the hypervisor 124 or that runs directly on the physical server host 116. In the illustrated example, the VSS network switch 118 is also executed in the hypervisor 124. For example, the VSS network switch 118 may be implemented using a vSphere® standard switch provided by VMware vSphere® virtualization infrastructure components software developed and sold by VMware, Inc. Alternatively, examples disclosed herein may be used with VSS network switches implemented using other virtualization software. In the illustrated example, the VDS network switch 120 is also executed in the hypervisor 124. In addition, the VDS network switch 120 is also executed in a hypervisor 126 that creates a virtual environment 128 of a second physical server host 130. For example, the VDS network switch 120 may be implemented using a vSphere® distributed switch provided by VMware vSphere® virtualization infrastructure components software developed and sold by VMware, Inc. Alternatively, examples disclosed herein may be used with VDS network switches implemented using other virtualization software.

In the illustrated example, to perform the VSS-to-VDS migration 114, the network switch migrator 100 implements GUIs that allow users to specify options for migrating the physical server host 116 from using the VSS network switch 118 to using the VDS network switch 120 using a faster and less cumbersome process than prior techniques for performing such network switch migration. In some examples, the network switch migrator 100 implements an application programming interface (API) that receives the user-specified selections for performing the network switch migration and provides the user-specified selections to the components of the network switch migrator 100. In some examples, the network switch migrator 100 implements a GUI wizard based on the API and based on different GUIs (e.g., the GUIs of FIGS. 3-6) for receiving user-specified selections for performing the network switch migration.

The example network switch migrator 100 is provided with the GUI generator 102 to generate GUIs for soliciting user input regarding how to perform the VSS-to-VDS migration 114. For example, the GUI generator 102 generates example GUIs of FIGS. 3-6. The GUI generator 102 may be implemented using one or more graphics libraries and graphical user control libraries executed by one or more processors (e.g., the processor 812 of FIG. 8). The GUIs generated by the GUI generator 102 may be displayed via a workstation that is in network communication with the physical server host 116 in which the GUI generator 102 is implemented. For example, the workstation may execute a web browser that sends hypertext transfer protocol (HTTP)

requests for the GUIs to a VM or physical machine that implements the GUI generator 102. The VM or physical machine implementing the GUI generator 102 may respond to the HTTP requests with the GUIs generated by the GUI generator 102. In some examples, the GUIs generated by the GUI generator 102 may additionally or alternatively be displayed via a web browser or application executing on the same VM or physical machine that implements the GUI generator 102. For example, the GUIs may be displayed in that same VM or physical machine by a vSphere® Web Client application (e.g., developed and sold by VMware, Inc.). The example network switch migrator 100 is provided with the user input interface 104 to receiving user inputs for performing the VSS-to-VDS migration 114. For example, the user input interface 104 may receive API parameters from user inputs and/or user selections via one or more GUIs generated by the GUI generator 102.

The example network switch migrator 100 is provided with the VDS creator 106 to create VDS network switches such as the VDS network switch 120. The example network switch migrator 100 is provided with the VSS detector 108 to determine whether physical NICs (VMNICs) (e.g., the VMNICs 210a,b of FIG. 2) selected for migrating to the VDS network switch 120 correspond to a single VSS network switch or multiple VSS network switches. The example network switch migrator 100 is provided with the port group creator 110 to create port groups (e.g., the port groups PrtGrp0 and PrtGrp1 of the VDS network switch 120 shown in FIG. 2) in the VDS network switch 120 for grouping distributed virtual ports (DVPs) (e.g., the DVPs 236a,b, 238a,b of FIG. 2). The example port group creator 110 creates port groups in the VDS network switch 120 during the VSS-to-VDS migration 114 to match existing port groups (e.g., port groups PrtGrp0 and PrtGrp1 of the VSS network switch 118 shown in FIG. 2) in the VSS network switch 118 so that network configuration settings for the existing port groups are migrated for corresponding physical NICs (VMNICs) to the new port groups in the VDS network switch 120. In addition, the port group creator 110 can create port groups for physical NICs (VMNICs) that are selected to be bound to the VDS network switch 120 and that are to have different network configuration settings than a previous port group from the VSS network switch 118.

The example network switch migrator 100 is provided with the configurator 112 to determine how to perform the VSS-to-VDS migration 114 and to configure network configuration settings in the VDS 120. For example, the configurator 112 determines how to perform the VSS-to-VDS migration 114 and generates a migration plan 132 based on user input received via the user input interface 104, based on whether user-selected physical NICs (VMNICs) correspond to a single VSS network switch or multiple network switches, and/or based on whether there are physical NICs (VMNICs) corresponding to infrastructure/management VMs that are to be migrated to the VDS network switch 120. In the illustrated example, the migration plan 132 is defined to be valid such that it does not render a configuration of the VDS network switch 120 inoperable after the VSS-to-VDS migration 114. To generate such a valid migration plan 132, the configurator 112 is provided with example migration rules 134 that the configurator 112 uses to confirm that user-provided input for specifying how to structure the VSS-to-VDS migration 114 will result in a valid and operable network configuration for the VDS network switch 120. The example migration rules 134 are described in more detail below in connection with FIG. 6.

The example configurator 112 is to configure the VDS 120 by accessing network configuration settings corresponding to the VSS network switch 118 and program or configure the network configuration settings in the VDS network switch 120. For example, the configurator 112 may access a VSS network configuration file (e.g., stored in the physical server host 116 or a data store or memory in communication with the physical server host 116) containing the network configuration settings of the VSS network switch 118 and migrate those network configuration settings to the VDS network switch 120 by programming the network configuration settings into one or more VDS network configuration files (e.g., stored in one or both of the physical server hosts 116,130 or a data store or memory in communication with the physical server hosts 116,130) corresponding to the VDS network switch 120.

In the illustrated example of FIG. 1, to migrate the physical server host 116 from the VSS network switch 118 to the VDS network switch 120, the user input interface 104 receives a user-selection of first physical NICs (VMNICs) (e.g., the VMNICs 210a,b of FIG. 2) of the physical server host 116 to migrate from the VSS network switch 118 to the VDS network switch 120. The example configurator 112 generates the migration plan 132 (FIG. 1) to configure the VDS network switch 120 using the same network configuration settings of the VSS network switch 118 corresponding to the selected first physical NICs (VMNICs). In addition, based on a user confirmation received as a user-selection to proceed with migration from the VSS network switch 118 to the VDS network switch 120: (a) the example VDS creator 106 creates the VDS network switch 120 in the first physical server host 116 and in the second physical server host 130, and (b) the example configurator 112 accesses the network configuration settings of the VSS network switch 118 and configures the network configuration settings in the VDS network switch 120. In some examples, the VSS-to-VDS migration 114 is initiated based on the GUI generator 102 generating a migration selection (GUI) (e.g., the migration selection GUI 300 of FIG. 3) to obtain a user-selection to migrate the VSS network switch 118 to the VDS network switch 120. In the illustrated example of FIG. 1, the hypervisor 126 of the second physical server host 130 also includes an example network switch migrator 136 that is substantially similar or identical to the network switch migrator 100. In this manner, the network switch migrator 100 can communicate network configuration settings to the network switch migrator 136 so that the network switch migrator 100 can configure the VDS network switch 120 in the first hypervisor 124 and the network switch migrator 136 can configure the VDS network switch 120 in the second hypervisor 126 using the same network configuration settings.

FIG. 2 shows additional details of the example physical server host 116 of FIG. 1 migrated from the VSS network switch 118 to the VDS network switch 120 of FIG. 1. In the illustrated example, the hypervisor 124 executes two VMs shows as VM0 202a and VM1 202b. Each VM 202a,b includes a corresponding vNIC 204a,b to provide the VMs 202a,b with network connectivity. The example VSS network switch 118 includes two virtual ports shown as VP1 206a and VP2 206b. The virtual ports 206a,b are connected to corresponding physical NICs (VMNICs) of the physical server host 116 represented in the example of FIG. 2 as VMNIC 210a and VMNIC 210b so that the virtual ports 206a,b can provide network connectivity outside the physical server host 116 for the VMs 202a,b through the VSS network switch 118. For example, to provide the VMs 202a,b network connectivity outside the physical server host 116, the VNICs 204a,b of the VMs 202a,b are connected to corresponding ones of the virtual ports 206a,b of the VSS network switch 118 so that network communications can be sent by the VMs 202a,b via the VMNICs 210a,b to destinations external to the physical server host 116 and so that network communication can be received by the VMs 202a,b via the VMNICs 210a,b from sources external to the physical server host 116. In the illustrated example of FIG. 2, the first virtual port VP1 206a is part of a first port group (PrtGrp0), and the second virtual port VP2 206b is part of a second port group (PrtGrp1). A port group can be used to apply the same network configuration settings for multiple virtual ports in that port group. Thus, network configuration settings of the first port group (PrtGrp0) may be different than network configuration settings of the second port group (PrtGrp1).

In the example of FIG. 2, the VSS network switch 118 runs numerous virtual adapters shown as virtual machine kernels (VMKs) including an example VMK0 management kernel 214, an example VMK1 VMotion kernel 216, an example VMK2 VSAN kernel 218, and an example VMK3 VXLAN 220. The VMK0 management kernel 214 virtual adapter is software executed by the VSS network switch 118 to manage use of physical hardware resources of the physical server host 116 allocated for use by the VSS network switch 118. The VMK1 VMotion 216 virtual adapter is software executed by the VSS network switch 118 to facilitate live migration of VMs between physical server hosts (e.g., between the physical server hosts 116, 130 of FIGS. 1 and 2) with substantially little or no downtime to provide continuous service availability from the VMs being migrated. The VMK2 VSAN 218 virtual adapter is software executed by the VSS network switch 118 to aggregate local server-attached data storage disks in a virtual cluster to create storage solutions that can be provisioned from the VSS network switch 118 during VM provisioning operations. The example VMK3 VXLAN 220 is virtual adapter software executed by the distributed switch to establish and/or support one or more virtual networks provisioned in the VSS network switch 118.

In the example of FIG. 2, each of the VMKs 214, 216, 218, 220 is connected to a corresponding VMK network adapter of the VSS network switch 118 shown as VMKNIC0 222, VMKNIC1 224, VMKNIC2 226, and VMKNIC3 228. In the illustrated example, the VMKNICs 222, 224, 226, 228 connect to ones of the VMNICs 210a,b (and/or other physical NICs of the physical server host 116 not shown) to provide the VMKs 214, 216, 218, 220 with network connectivity. In the illustrated example, the VMKs provide network connectivity to infrastructure/management VMs that execute virtualization infrastructure and/or virtualization management components. For example, the VM0 202a is an infrastructure/management VM that executes a VMware VSAN™ network data storage virtualization component 232 for creating and managing virtualized network data storage. In other examples, the network data storage virtualization component 232 may be implemented using any suitable network data storage virtualization component other than the VMware VSAN™ network data storage solution.

When performing the VSS-to-VDS migration 114 for VSAN-enabled VMs (e.g., VMs to which virtualized network data stores are allocated or allocatable), high availability can be enabled by selecting at least two physical NICs (VMNICs) per physical server host for use by the VSAN-enabled VMs. High availability is a feature that allows continuous network connectivity even when one physical NIC (VMNIC) become disabled (e.g., due to a malfunction or maintenance). For example, to accomplish this, some suppliers offer VSAN-ready physical server hosts that include 2, 3, or 4 10-gigabyte (10 G) physical NICs (VMNICs). In some instances, when a user initially installs a hypervisor (e.g., the hypervisor 124) in a physical server host (e.g., the physical server host 116), the hypervisor installation binds only one physical NIC (VMNIC) to a VSS network switch (e.g., the VSS network switch 118). When preparing to perform the VSS-to-VDS migration 114, a user may select to migrate the already bound physical NIC (VMNIC) to the VDS network switch 120 and may also select one or more unused physical NICs (VMNICs) of the physical server host to bind to the new VDS network switch 120 so that the physical server host can provide high availability via at least two physical NICs (VMNICs) for the VSAN-enabled VMs.

In the illustrated example of FIG. 2, when the network switch migrator 100 performs the VSS-to-VDS migration 114, the VDS network switch 120 is instantiated across the hypervisors 124, 126 of the two physical server hosts 116, 130 and the VMKs 214, 216, 218, 220 and corresponding VMKNICs 222, 224, 226, 228 are migrated to the VDS network switch 120. Also, in the example of FIG. 2, the network switch migrator 100 creates distributed virtual ports (DVPs) and port groups (PrtGrps) for the VDS network switch 120. In the illustrated example, the port groups are shown as PrtGrp0 and PrtGrp1 which are distributed across the two physical server hosts 116, 130 and which correspond to the port groups PrtGrp0 and PrtGrp1 of the VSS network switch 118 that were in place prior to the VSS-to-VDS migration 114. A port group is used to apply the same network configuration settings to multiple DVPs to provide VMs connected to that port group with the same type of network connectivity. Thus, network configuration settings for the first port group (PrtGrp0) may be different than network configuration settings for the second port group (PrtGrp1). The example port group PrtGrp0 includes DVP1 236a of the first physical server host 116 and DVP2 236b of the second physical server host 130. The example port group PrtGrp1 includes DVP1 238a of the first physical server host 116 and DVP2 238b of the second physical server host 130. In the illustrated example, each of the DVPs 236a, 238a of the first physical server host 116 is bound to one of the VMNICs 210a,b. For example, the DVPs 236a, 238a can be bound to the same one of the VMNICs 210a,b or to different ones of the VMNICs 210a,b. Similarly, each of the DVPs 236b, 238b of the second physical server host 130 is bound to a VMNIC 242a,b of the second physical server host 130. For example, the DVPs 236b, 238b can be bound to the same one of the VMNICs 242a,b or to different ones of the VMNICs 242a,b. In this manner, the VMNICs are the physical network resources that serve the DVPs 236a,b, 238a,b. The example DVPs 236a,b, 238a,b are allocatable to applications running in VMs 202a,b to communicate over a network.

In the illustrated example, after the VSS-to-VDS migration 114, the VDS network switch 120 enables implementing a number of features across the virtual environments 122, 128. Such an example feature includes applying the same network configuration settings to DVPs in the same port group instantiated across the two hypervisors 124,126. For example, the same network configuration settings can be applied to the DVPs 236a,b across the two hypervisors 124,126 by applying the network configuration settings to the PrtGrp0 port group. Similarly, the DVPs 238a,b can be configured with the same network configuration settings across the two hypervisors 124,126 by applying the network configuration settings to the PrtGrp1 port group. Another example feature enabled by the VDS network switch 120 includes migrating VMs between the two hypervisors 124, 126. For example, the VM1 202b is shown being migrated from the first hypervisor 124 to the second hypervisor 126 using a VM migration process 244. Such VM migration process 244 may be performed using the VMK1 VMotion 216 virtual adapter executed in the VDS network switch 120. In some examples, another VM shown as VM2 246 may be instantiated in the hypervisor 1 and associated to the DVP1 238a. In such examples, network configuration changes made to the port group PrtGrp1 impact network communication features/capabilities of the VM2 246 in the first physical server host 116 and the VM1 202b in the second physical server host 130 because both VMs 246, 202b are connected to the same port group PrtGrp1.

FIGS. 3-6 show example GUIs that are generated by the GUI generator 102 to enable a user to initiate the VSS-to-VDS migration 114. In some examples, the GUI generator 102 generates the example GUIs of FIGS. 3-6 for presentation to a user in response to a system health check that determines optimizations can be performed to network configurations. For example, a virtualization manager (e.g., VMware NSX® network virtualization manager that is developed and sold by VMware, Inc. and runs in the hypervisor 124 of FIGS. 1 and 2) can perform health checks from time to time of virtual computing components and may recommend system optimizations to improve computing or management efficiencies. In some instances, the virtualization manager may recommend that one or more clusters of physical server hosts be migrated from VSS network switches to one or more VDS network switches. If a user elects to perform such a migration using the example GUIs of FIGS. 3-6, after the migration to one or more VDS network switches is performed, the virtualization manager may display an updated health status of the system showing system improvements based on the migration to the one or more VDS network switches.

FIG. 3 is an example migration selection GUI 300 to enable a user to initiate the VSS-to-VDS migration 114 (FIGS. 1 and 2) by specifying a migration from a VSS network switch (e.g., the VSS network switch 118 of FIGS. 1 and 2) to a VDS network switch (e.g., the VDS network switch 120 of FIGS. 1 and 2). The example GUI generator 102 generates the migration selection GUI 300 to include a VDS name field 302 and a VDS creation type list control 304. The example VDS name field 302 enables a user to provide a name for the VDS network switch 120 that is to be created. The user-provided VDS name in the VDS name field 302 is received by the example user input interface 104 of FIG. 1 so that the example VDS creator 106 of FIG. 1 can create the corresponding VDS network switch 120.

The example VDS creation type list control 304 includes a user-selectable "create new VDS" option to create a new VDS network switch and attach only unused VMNICS to the new VDS network switch. The example VDS creation type list control 304 also includes a "migrate existing VSS" option to migrate VMNICs from one or more existing VSS network switches (e.g., the VSS network switch 118) to a newly created VDS network switch (e.g., the VDS network switch 120). In the illustrated example, when a user selects the "migrate existing VSS" option, the user input interface 102 obtains a user-selection from the migration selection GUI 300 indicating a request to migrate the VSS network switch 118 to the VDS network switch 120. The example GUI generator 102 generates the migration selection GUI 300 to present physical network adapters (e.g., the VMNICs 210a,b of FIGS. 1 and 2) grouped by network adapter name so that network adapters to be migrated to the VDS network switch 120 can be selected by a user based on name. In FIG. 3, before a user selects one of the "create new VDS" option or the "migrate existing VSS" option, the migration selection GUI 300 presents three network adapter names shown as vmnic1, vmnic3, and vmnic2 that correspond to unused physical NICs (e.g., VMNICs that have not been assigned to a network switch). Each of the network adapter names is assigned to multiple physical NICs (e.g., the VMNICs 210a,b of FIG. 2) assigned unique internet protocol (IP) addresses. For example, the network adapter name vmnic1 corresponds to three VMNICs having IP address 10.26.236.91, IP address 10.26.235.208, and IP address 10.26.235.66. Similarly, the network adapter name vmnic3 corresponds to three VMNICs assigned corresponding IP address, and the network adapter name vmnic2 corresponds to three VMNICs assigned corresponding IP addresses. Thus, in the illustrated example, to display a group of physical network adapters of a host in the migration selection GUI 300, the physical NICs (VMNICs) are assigned the same name (e.g., vmnic1 or vmnic2 or vmnic3). To select physical network adapters in the migration selection GUI 300 to bind to the VDS network switch 120, a user selects a network adapter name such that all of the physical network adapters corresponding to the selected network adapter name are bound to the VDS network switch 120.

FIG. 4 is an example network adapter selection GUI 400 that is presented after a user has selected the "migrate existing VSS" option of the migration selection GUI 300 of FIG. 3. The example network adapter selection GUI 400 of FIG. 4 enables a user to specify network adapters to migrate from the VSS network switch 118 (FIGS. 1 and 2) to the VDS network switch 120 (FIGS. 1 and 2). In the illustrated example, in response to the user selecting the "migrate existing VSS" option of the migration selection GUI 300, the GUI generator 102 (FIG. 1) generates the network adapter selection GUI 400 to display a network adapter name vmnic0 corresponding to the VMNICs 210a,b (FIG. 2) bound to the same VSS network switch (e.g., the VSS network switch 118), which is shown as having switch name vSwitch0 in FIG. 4. In the example of FIG. 4, a user has selected the network adapter name vmnic0 to migrate all of the associated VMNICs 210a,b to the VDS network switch 120. By selecting the network adapter name vmnic0, the user also confirms that the network setting configurations for the associated VMNICs 210a,b are to be migrated from the VSS network switch 118 to the VDS network switch 120. Although not shown in the example of FIG. 4, a user may also select unused physical NICs (VMNICs) by selecting one or more of the other network adapter names vmnic1, vmnic2, vmnic3 to bind corresponding ones of the unused physical NICs (VMNICs) to the VDS network switch 120. In some examples, one or both of the VMNICs 242a,b of FIG. 2 may be unused physical NICs (VMNICs) if one or both is/are not connected to a VSS network switch of the second physical host 130.

Although the example network adapter selection GUI 400 shows user selection of only a single network adapter name vmnic0 that corresponds to a single physical server host 116, in other examples, a single network adapter name may correspond to physical NICs (VMNICs) bound to respective VSS network switches in multiple physical server hosts belonging to a same cluster and/or a user may select multiple network adapter names of physical NICs (VMNICs) bound to respective VSS network switches in multiple physical server hosts belonging to a same cluster. In such examples, the VSS-to-VDS migration 114 migrates the selected physical NICs (VMNICs) from their respective VSS network switches of the separate physical server hosts to the VDS network switch 120 instantiated across those physical server hosts.

FIG. 5 is an example migrate infrastructure/management VM selection GUI 500 to enable a user to select one or more infrastructure/management VMs to migrate from the VSS network switch 118 (FIGS. 1 and 2) to the VDS network switch 120 (FIGS. 1 and 2). For example, the GUI generator 102 (FIG. 1) generates the migrate infrastructure/management VM selection GUI 500 to present a VM name of VSAN VM corresponding to an infrastructure/management VM implemented by the virtual machine VM0 202a of FIG. 2 running the VMware VSAN™ network data storage virtualization component 232. The example migrate infrastructure/management VM selection GUI 500 is provided so that any infrastructure/management VM selected by a user is handled in a manner that associated network configuration settings remain the same after the VSS-to-VDS migration 114 and the infrastructure/management VM continues to operate the same after it is migrated from the VSS network switch 118 to the VDS network switch 120. Migrating infrastructure/management VM(s) properly facilitates successfully performing the VSS-to-VDS migration 114 because aspects (e.g., virtualization management) of the infrastructure/management VM(s) are used to perform the VSS-to-VDS migration 114. However, the infrastructure/management VM(s) must also be migrated. During the VSS-to-VDS migration 114, the example configurator 112 the duration for which the infrastructure/management VM(s) lose network connectivity in the process by, for example, disconnecting from a source VSS network switch (e.g., the VSS network switch 118), connecting to a new VDS network switch (e.g., the VDS network switch 120), and applying corresponding network configuration settings in as few operations as possible (e.g., a single operation). In some examples, migration of the infrastructure/management VM(s) is performed in a single operation because if two or more operations are used, after an infrastructure/management VM loses network connectivity, it cannot request a second operation to complete the infrastructure/management VM migration. As such, when a single operation is used to migrate the infrastructure/management VM(s), the example configurator 112 coordinates the migration of the infrastructure/management VM(s) with the example hypervisor 124 running the infrastructure/management VM(s) so that the hypervisor 124 creates implements the single operation with atomicity by coordinating the migration actions (e.g., disconnecting, connecting, applying network configuration settings) in the single operation quickly so the infrastructure/management VM(s) does/do not notice and continue(s) where it/they left off.

If after the VSS-to-VDS migration 114 a total power failure occurs, or a planned shutdown occurs, or if there is an issue with network connectivity, the infrastructure/management VM(s) may be shutdown (e.g., due to a power failure) or unreachable (e.g., due to network connectivity issues). In such cases, the infrastructure/management VM(s) is/are not available to recover from such situations. Thus, the VSS-to-VDS migration 114 places the infrastructure/management VM(s) in a special mode, in which resources (e.g., distributed virtual ports (DVPs)) of the hypervisor 124 are pre-allocated, and an external component (e.g., another hypervisor 126) is allowed to manage the physical server host 116 of the hypervisor 124 directly, deviating from normal operation conditions in which all management operations are to be coordinated by the infrastructure/management VM(s) of the hypervisor 124. For example, the hypervisor 126 and/or the network switch migrator 136 of the hypervisor 126 may mange the physical server host 116 until the physical host server 116 recovers.

FIG. 6 is an example pre-migration validation GUI 600 to show whether a VSS-to-VDS migration plan (e.g., the migration plan 132 of FIG. 1) is valid. For example, the configurator 112 (FIG. 1) of the network switch migrator 100 generates the migration plan 132 based on the user-provided selections of the GUIs 300, 400, 500 of FIGS. 3-5 received via the user input interface 104 (FIG. 1), and the GUI generator 102 generates the pre-migration validation GUI 600 to present such migration plan 132 to a user. The example migration plan 132 presented in the pre-migration validation GUI 600 shows IP addresses of selected VMNICs that will be migrated to the VDS network switch 120 and that the VMNICs have been confirmed valid for migrating. In this manner, the user is provided with visual confirmation that the user-provided selections of the GUIs 300, 400, 500 of FIGS. 3-5 will be used for performing the VSS-to-VDS migration 114. The example migration plan 132 is defined to be safe (e.g., the effective data path for all impacted VMs, VMNICs, VMKNICs, etc. are to use the same settings as before the migration). However, after the VSS-to-VDS migration 114, differences in the VDS network switch configuration relative to the VSS network switch configuration may be in the form of any newly added unused physical NICs (VMNICs) selected by the user via the network adapter selection GUI 400.

If the migration plan 132 presented in the pre-migration validation GUI 600 differs from the user's intentions based on the user-provided inputs via the GUIs 300, 400, 500, the user can cancel the VSS-to-VDS migration 114 and/or revise the user-provided inputs to change the migration plan 132. For example, the migration plan 132 generated by the configurator 112 may differ from the user-provided input based on one or more of the migration rules 134 (FIG. 1) that the configurator 112 determines is/are not satisfied. An example migration rule 134 is that all physical server hosts corresponding to selected physical NICs (VMNICs) must include a network switch migrator (e.g., the network switch migrator 100,136 of FIGS. 1 and 2) so that network configuration settings can be properly programmed for the VDS network switch 120 in the corresponding hypervisors. In examples in which the network switch migrator 100,136 implements an API, the example migration rule 134 causes the configurator 112 to determine whether all physical server hosts associated with the migration are running the API. Another example migration rule 134 is that all physical server hosts corresponding to selected physical NICs (VMNICs) must be reachable. A physical server host may be unreachable if it is offline, in an unreachable network domain, busy with an uninterruptable process that would be affected by the VSS-to-VDS migration 114, etc. Another example migration rule 134 is that a VM cannot be orphaned as a result of the VSS-to-VDS migration 114. For example, a VM may be orphaned if it is connected to a physical NIC (VMNIC) through a VSS network switch that is to be removed and the physical NIC (VMNIC) was not selected for migration to a VDS network switch. Yet another example migration rule 134 is that network configuration settings must be the same across all VSS network switches in separate physical server hosts corresponding to user-selected physical NICs (VMNICs) that are to be migrated to a single VDS network switch.

If the configurator 112 determines that any migration rule 134 is not satisfied, the configurator 112 may modify the user-provided input from the example GUIs 300, 400, 500 to generate a proposed migration plan 132 that does satisfy the migration rules 134. For example, the configurator 112 may remove physical NICs (VMNICs) of selected network adapter names (e.g., vmnic0) that do not satisfy the migration rules 134 and maintain only physical NICs (VMNICs) of selected network adapter names that do satisfy the migration rules 134. In this manner, the VSS-to-VDS migration 114 can perform a migration to convert instances of VSS network switches (e.g., the VSS network switch 118) per physical server host (e.g., physical server hosts in a cluster) to the newly created VDS network switch 120 in such a manner that the VDS network switch 120 preserves all settings of the VSS network switches by taking into consideration that all associated network adapters (e.g., VM VNICs, VMNICs, VMKNICs, etc.) are to be validly migrated such that they maintain connectivity and operability as before the migration. The migration plan 132 generated by the configurator 112 ensures that instances of VSS network switches (e.g., the VSS network switch 118) and port groups (e.g., the port groups PrtGrp0 and PrtGrp1 of FIG. 2) across physical server hosts are matched to each other by the same names. In addition, based on the migration rules 134, the configurator 112 generates the migration plan 132 so that physical server hosts involved in the VSS-to-VDS migration 114 have the same network configuration settings for their VSS network switches. In some examples, if deviations are found between network configuration settings of the VSS network switches, a user may select to configure additional port groups in the newly created VDS network switch 120 for physical NICs (VMNICs) that are subject to such deviating network configuration settings.

When the migration plan 132 presented in the pre-migration validation GUI 600 reflects the user's intentions based on the user-provided inputs via the GUIs 300, 400, 500, the user can select a "Finish" button control 602 of the pre-migration validation GUI 600 to begin the VSS-to-VDS migration 114. When the user input interface 104 detects that a user has selected the "Finish" button control 602 of the pre-migration validation GUI 600, the network switch migrator 100 performs tasks to automate the VSS-to-VDS migration 114 based on the user-provided input received by the user input interface 104 from the GUIs 300, 400, 500 of FIGS. 3-5.

In examples disclosed herein, the GUI generator 102 (FIG. 1) may implement means for generating GUIs (e.g., the GUIs of FIGS. 3-6). In examples disclosed herein, the user input interface 104 (FIG. 1) may implement means for obtaining user input. In examples disclosed herein, the VDS creator 106 (FIG. 1) may implement means for creating VDS network switches (e.g., the VDS network switch 120 of FIGS. 1 and 2). In examples disclosed herein, the VSS detector 108 (FIG. 1) may implement means for determining that physical NICs (VMNICs) (e.g., the VMNICs 210a,b and 242a,b of FIG. 2) selected to be migrated to a VDS network switch correspond to separate VSS network switches (e.g., the VSS network switch 118 of FIGS. 1 and 2 and a separate VSS network switch of the second physical server host 130). In examples disclosed herein, the port group creator 110 (FIG. 1) may implement means for creating port groups (e.g., PrtGrp0 and PrtGrp1 of FIG. 2). In examples disclosed herein, the configurator 112 (FIG. 1) may implement means for configuring VDS network switches (e.g., the VDS network switch 120), means for generating a migration plan (e.g., the migration plan 132), means for configuring network configuration settings in VDS network switches (e.g., the VDS network switch 120), means for determining that a physical NIC (VMNIC) corresponds to a infrastructure/management VM, means for accessing network configuration settings, and means for confirming that a user-approved migration plan matches an original migration plan (e.g., the migration plan 132).

While an example manner of implementing the network switch migrator 100 is illustrated in FIG. 1, one or more of the elements, processes and/or devices illustrated in FIG. 1 may be combined, divided, re-arranged, omitted, eliminated and/or implemented in any other way. Further, the example GUI generator 102, the example user input interface 104, the example VDS creator 106, the example VSS detector 108, the example port group creator 110, and the example configurator 112 and/or, more generally, the example network switch migrator 100 of FIG. 1 may be implemented by hardware, software, firmware and/or any combination of hardware, software and/or firmware. Thus, for example, any of the example GUI generator 102, the example user input interface 104, the example VDS creator 106, the example VSS detector 108, the example port group creator 110, and the example configurator 112 and/or, more generally, the example network switch migrator 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example GUI generator 102, the example user input interface 104, the example VDS creator 106, the example VSS detector 108, the example port group creator 110, and/or the example configurator 112 is/are hereby expressly defined to include a non-transitory computer readable storage device or storage disk such as a memory, a digital versatile disk (DVD), a compact disk (CD), a Blu-ray disk, etc. including the software and/or firmware. Further still, the example network switch migrator 100 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7A:
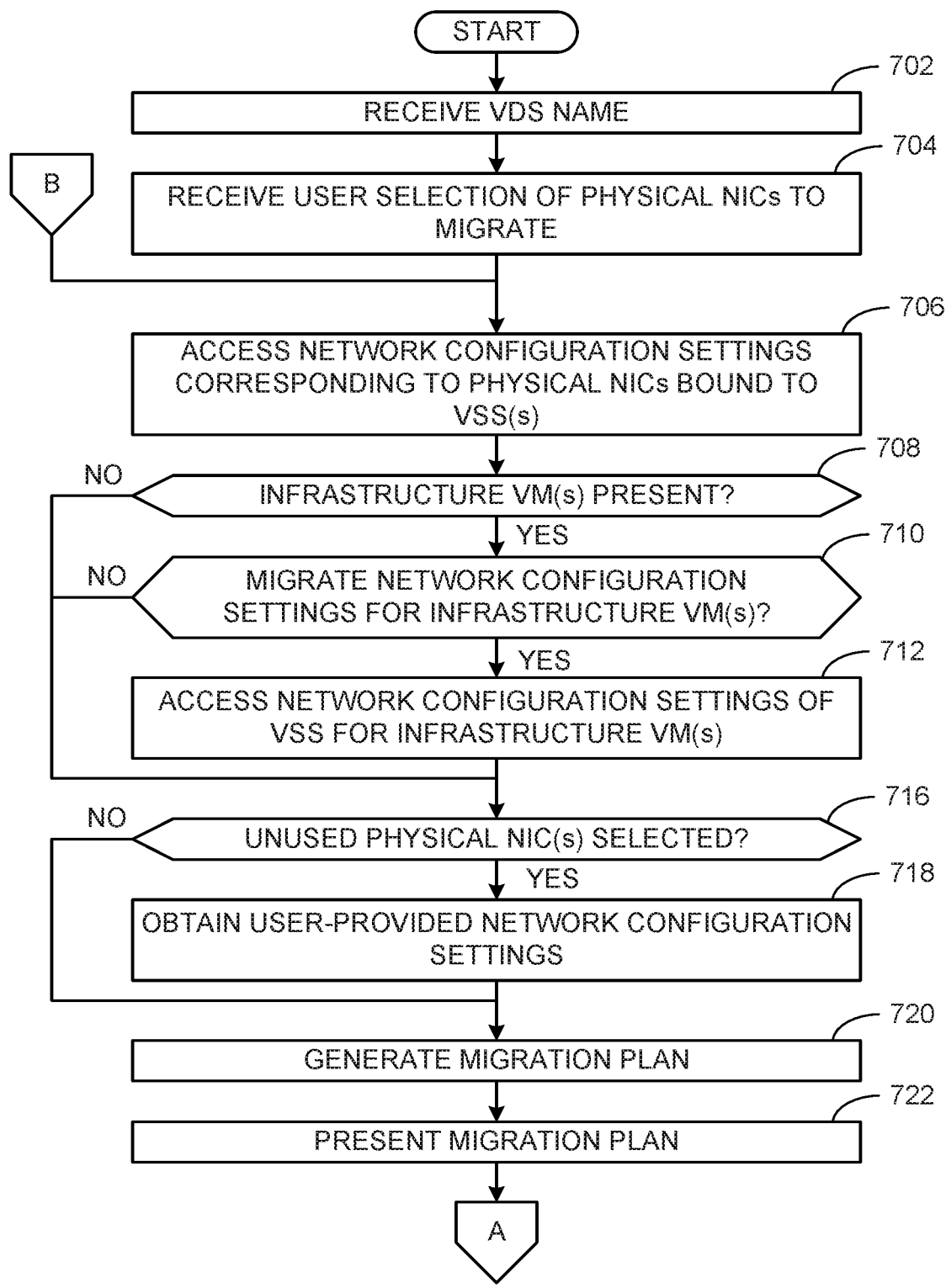
FIGS. 7A and 7B illustrate a flow chart representative of example machine readable instructions that may be executed by one or more processors to implement the network switch migrator of FIGS. 1 and 2 to perform VSS-to-VDS migrations in accordance with teachings of this disclosure.
Figure 7B:
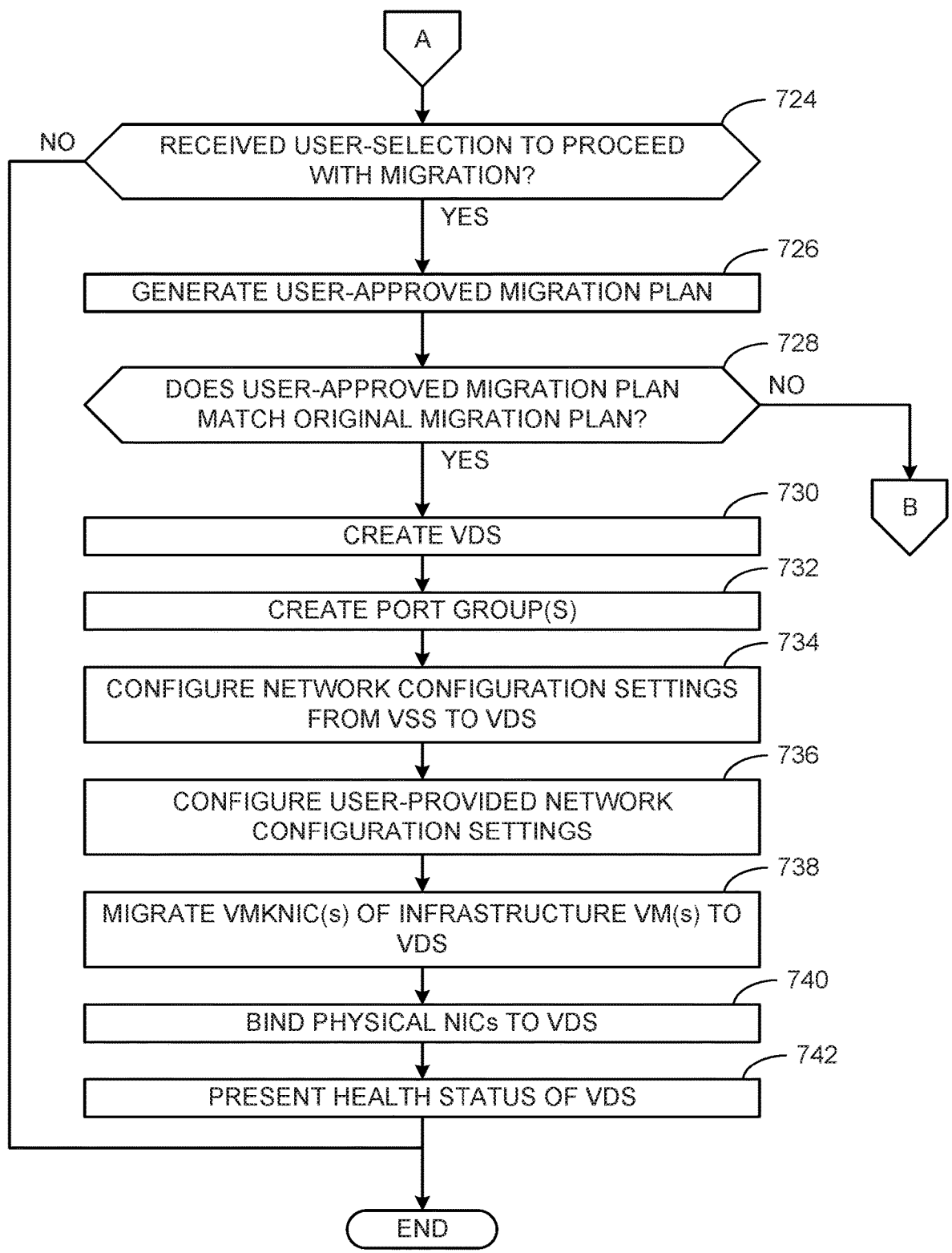

FIGS. 7A and 7B illustrate a flow chart representative of example machine readable instructions that may be executed by one or more processors to implement the network switch migrator 100 of FIGS. 1 and 2 to perform VSS-to-VDS migrations (e.g., the VSS-to-VDS migration 114 of FIGS. 1 and 2). The machine readable instructions may be implemented as one or more program(s) or portion of one or more program(s) for execution by a processor such as the processor 812 shown in the example processor platform 800 discussed below in connection with FIG. 8. The program(s) may be embodied in software stored on a non-transitory computer readable storage medium such as a CD-ROM, a floppy disk, a hard drive, a DVD, a Blu-ray disk, or a memory associated with the processor 812, but the entirety of the program(s) and/or parts thereof could alternatively be executed by a device other than the processor 812 and/or embodied in firmware or dedicated hardware. Further, although the example program(s) is/are described with reference to the flow chart illustrated in FIGS. 7A and 7B, many other methods of implementing the example network switch migrator 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 7A and 7B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

In some examples, the program(s) of FIGS. 7A and 7B begin in response to a system health check that determines optimizations can be performed to network configurations. In other examples, the program(s) of FIGS. 7A and 7B are initiated by a user independent of a system health check. The example program(s) of FIGS. 7A and 7B begin(s) at block 702 at which the example user input interface 104 (FIG. 1) receives a VDS name. For example, the user input interface 104 receives the VDS name via the migration selection GUI 300 of FIG. 3 and/or the network adapter selection GUI 400 of FIG. 4. The VDS name is to be used for the VDS network switch 120 (FIGS. 1 and 2) to be created and configured during the VSS-to-VDS migration 114 (FIGS. 1 and 2). The user input interface 104 receives a user selection of physical NICs (VMNICs) to migrate (block 704). In the illustrated example, the user input interface 104 receives the user selection of the physical NICs (VMNICs) via the network adapter selection GUI 400 as described above in connection with FIG. 4. For example, the user input interface 104 receives a user-selection of first physical NICs (VMNICs) (e.g., physical NICs (VMNICs) such as the VMNICs 210a,b of FIG. 2 corresponding to the network adapter name vmnic0 shown in FIG. 4) of the physical server host 116 to migrate from the VSS network switch 118 to the VDS network switch 120. In some examples, at block 704, the user input interface 104 may also receive a user selection of second physical NICs (VMNICs) that are unused physical NICs not bound to the VSS network switch 118 (e.g., physical NICs (VMNICs) corresponding to one or more of the network adapter names shown as vmnic1, vmnic2, and vmnic3 in FIG. 4). In some examples, one or both of the VMNICs 242a,b of FIG. 2 may be unused physical NICs (VMNICs) if one or both is/are not connected to a VSS network switch of the second physical host 130.

The example configurator 112 (FIG. 1) accesses network configuration settings corresponding to ones of the physical NICs (VMNICs) bound to one or more VSS network switches to be migrated (block 706). For example, the user selection of physical NICs (VMNICs) received at block 704 may correspond to one VSS network switch (e.g., the VSS network switch 118) or to multiple VSS network switches (e.g., the VSS network switch 118 and at least a second VSS network switch). In some examples, a user selection may include one or both of the VMNICs 210a,b corresponding to the VSS network switch 118 and one or more physical NICs (VMNICs) (e.g., one or both of the VMNICs 242a,b) that correspond to a separate VSS network switch of the second physical host 130. When there are multiple VSS network switches, the example VSS detector 108 (FIG. 1) determines that first ones of the physical NIC(s) (VMNICs) selected at block 704 to migrate to the VDS network switch 120 correspond to the VSS network switch 118 and that second ones of the physical NIC(s) (VMNICs) selected at block 704 correspond to a second VSS network switch separate from the VSS network switch 118. In such examples, when the network configuration settings are the same for the VSS network switch 118 and the second VSS network switch, the configurator 112 accesses the network configuration settings of the VSS network switch 118 to configure the same network configuration settings in the VDS network switch 120 for both of the first and second ones of the selected physical NICs (VMNICs). Otherwise, when the network configuration settings are different for the VSS network switch 118 and the second VSS network switch, the configurator 112 accesses first network configuration settings of the VSS network switch 118 to configure a first port group (e.g., PrtGrp0 of FIG. 2) in the VDS network switch 120 for the first ones of the selected physical NICs and accesses second network configuration settings in the second VSS network switch to configure a second port group (e.g., PrtGrp1 of FIG. 2) in the VDS network switch 120 for the second ones of the selected physical NICs.

The example configurator 112 determines whether there is any infrastructure/management VM present (block 708). For example, the configurator 112 may determine whether any of the physical NICs (VMNICs) selected at block 704 corresponds to an infrastructure/management VM such as the infrastructure/management VM implemented by the virtual machine VM0 202a of FIG. 2 running the VMware VSAN™ network data storage virtualization component 232. In some examples, to determine whether a VM is an infrastructure/management VM, the configurator 112 may search for running processes in VMs having application identifiers corresponding to an infrastructure/management virtualization component. If there is no infrastructure/management VM present, control advances to block 716. Otherwise, if there is at least one infrastructure/management VM present, the configurator 112 determines whether to migrate network configuration settings for the infrastructure/management VM(s) (block 710). For example, the GUI generator 102 (FIG. 1) may generate and provide the migrate infrastructure/management VM selection GUI 500 for presenting detected infrastructure/management VM(s) to a user. In this manner, the user input interface 104 may receive a user selection of one or more infrastructure/management VM(s) via the infrastructure/management VM selection GUI 500 to confirm that network configuration settings for the selected infrastructure/management VM(s) are to be migrated from the VSS network switch 118 to the VDS network switch 120.

If at block 710, the example configurator 112 determines that network configuration settings for the infrastructure/management VM(s) are not to be migrated, control advances to block 716. Otherwise, if the example configurator 112 determines at block 710 that network configuration settings for the infrastructure/management VM(s) are to be migrated, the configurator 112 accesses network configuration settings of the VSS network switch 118 for the infrastructure/management VM(s) (block 712). In some examples, existing network configuration settings are to be migrated for one or more infrastructure/management VM(s) and not migrated for another one or more infrastructure/management VM(s). In such examples, control proceeds to block 712 for the one or more infrastructure/management VM(s) for which existing network configuration settings are to be migrated, and control advances to block 716 for the one or more infrastructure/management VM(s) for which existing network configuration settings are not to be migrated.

At block 716, the example configurator 112 determines whether any unused physical NIC(s) (VMNIC(s)) have been selected. For example, one or more of the user-selected physical NICs of block 704 may be unused physical NICs (VMNICs) that are not bound to a VSS network switch. If at block 716 the example configurator 112 determines that there is no unused physical NIC (VMNIC) that has been selected, control advances to block 720. Otherwise, at block 718 the user input interface 104 obtains user-provided network configuration settings for the unused physical NIC(s) (VMNIC(s)) and/or for infrastructure/management VM(s) for which existing network configuration settings are not to be migrated. For example, the GUI generator 102 may generate a user-defined network configuration settings GUI via which a user may enter network configuration settings (e.g., port group name, bandwidth limits, quality of service (QoS) parameters, priority, parity, etc.) for the unused physical NIC(s) (VMNIC(s)) and/or for infrastructure/management VM(s).

At block 720, the configurator 112 generates the migration plan 132. For example, the configurator 112 generates the migration plan 132 (FIG. 1) to include network configuration settings obtained at block 706 for ones of the physical NICs (VMNICs) bound to one or more VSS network switches to be migrated. If infrastructure/management VM(s) is/are present, the configurator 112 adds to the migration plan 132 existing network configuration settings for the infrastructure/management VMs obtained at block 712 or user-provided network configuration settings for the infrastructure/management VMs obtained at block 718. If unused physical NIC(s) (VMNIC(s)) are present, the configurator 112 adds the user-defined network configuration settings for the unused physical NIC(s) (VMNIC(s)) obtained at block 718 to the migration plan 132. When multiple VSS network switches are involved in the VSS-to-VDS migration 114 (FIGS. 1 and 2), the configurator 112 generates the migration plan 132 to reflect how the physical NICs (VMNICs) will be migrated from the multiple VSS network switches to one or more port groups (e.g., PrtGrp0 and/or PrtGrp1 of FIG. 2) in the VDS network switch 120. For example, when all of the VSS network switches use the same network configuration settings, the physical NICs (VMNICs) bound to those VSS network switches can be assigned to the same port group of the VDS network switch 120. However, when some of the VSS network switches use different network configuration settings, the physical NICs (VMNICs) can be separated into different port groups based on the network configuration settings of the VSS network switches. For example, ones of the physical NICs (VMNICs) corresponding to VSS network switches having the same network configuration settings can be assigned to the same port group (e.g., PrtGrp0), and others of the physical NICs (VMNICs) corresponding to one or more other VSS network switches to which other network configuration settings are applied can be assigned to a separate port group (e.g., PrtGrp1).

The example GUI generator 102 presents the migration plan 132 (block 722). For example, the configurator 112 may provide the migration plan 132 to the GUI generator 102 as a parameter (e.g., in an API call), and the GUI generator 102 may generate the pre-migration validation GUI 600 for presenting the migration plan 132. The configurator 112 determines whether a user-selection to proceed with migration from the VSS network switch 118 to the VDS network switch 120 has been received (block 724) (FIG. 7B). For example, the configurator 112 may determine whether the user input interface 104 has detected a user-selection of the "Finish" button control 602 of FIG. 6 to indicate user confirmation to proceed with the migration. If the configurator 112 determines at block 724 that it has not received user-selection to proceed with the migration, the example process of FIGS. 7A and 7B ends. Otherwise, control proceeds to block 726 at which the configurator 112 generates a user-approved migration plan. In the illustrated example, a user may make changes to the migration plan 132 via the pre-migration validation GUI 600. As such, the configurator 112 generates the user-approved migration plan at block 726 (e.g., based on user input via the pre-migration validation GUI 600) to account for changes, if any, made by a user to the migration plan 132. The example configurator 112 determines whether the user-approved migration plan matches the original migration plan 132 (block 728). If the user-approved migration plan does not match the original migration plan 132, control returns to block 706 of FIG. 7A so that updated network configuration settings for any changes can be obtained.

If the configurator 112 confirms at block 728 that the user-approved migration plan does match the original migration plan 132, control proceeds to block 730 at which the example VDS creator 106 (FIG. 1) creates the VDS network switch 120. For example, the VDS creator 106 can create the VDS network switch 120 and assign it the VDS name received at block 702. The example port group creator 110 (FIG. 1) creates one or more port group(s) (block 732). For example, the port group creator 110 can create one or more port group(s) specified in the migration plan 132. For the illustrated example of FIG. 2, the port group creator 110 can create, at block 732, the port group PrtGrp0 in the VDS network switch 120 and configure the port group PrtGrp0 to include the first distributed virtual port DVP1 236*a* in the first physical server host 116 and to include the second distributed virtual port DVP2 236b in the second physical server host 130. In such an example, the port group PrtGrp0 created in the VDS network switch 120 matches the port group PrtGrp0 from the VSS network switch 118 that is in the migration plan 132. The example configurator 112 configures the network configuration settings from one or more VSS network switch(s) to the VDS network switch 120 (block 734). For example, the configurator 112 may apply to the VDS network switch 120 the network configuration settings obtained at block 706 (e.g., network configuration settings that do not correspond to infrastructure/management VM(s)) and/or obtained at block 712 (e.g., network configuration settings corresponding to one or more infrastructure/management VM(s)) from the VSS network switch 118 and/or other VSS network switches. The example configurator 112 configures the VDS network switch 120 with user-provided network configuration settings (block 736). For example, the configurator 112 configures the VDS network switch 120 with the user-provided network configuration settings obtained at block 718. However, in examples in which user-provided network configuration settings are not received at block 718, the operation of block 736 may be omitted.

The example configurator 112 migrates the VMKNIC(s) of infrastructure/management VM(s) to the VDS network switch 120 (block 738). For example, the configurator 112 migrates one or more of the VMKNICs 222, 224, 226, 228 of FIG. 2 from the VSS network switch 118 to the VDS network switch 120 by binding the one or more of the VMKNICs 222, 224, 226, 228 to the VDS network switch 120. The example configurator 112 binds the physical NICs (VMNICs) to the VDS network switch 120 (block 740). For example, the configurator 112 binds the physical NICs (VMNICs) selected at block 704 to the VDS network switch 120 to enable network connectivity between the physical NICs (VMNICs) and the VDS network switch 120. In this manner, network communications via the VDS network switch 120 can begin. In the illustrated example, the GUI generator 102 presents a health status of the VDS network switch 120 (block 742). For example, the GUI generator 102 may generate a health status GUI that includes connectivity indications confirming that the physical server hosts 116,130 are connected to the VDS network switch 120. In addition, the GUI generator 102 may include in the health status GUI an updated health status of the system showing system improvements based on the VSS-to-VDS migration 114 to the VDS network switch 120. The example process of FIGS. 7A and 7B then ends. In some examples, the process of FIGS. 7A and 7B may be performed multiple times to, for example, create multiple VDS network switches. For example, a user may elect to migrate different VSS network switches to different VDS network switches. In such examples, the GUI generator 102 may generate a GUI providing a user with an option to perform another VSS-to-VDS migration 114.

Figure 8:
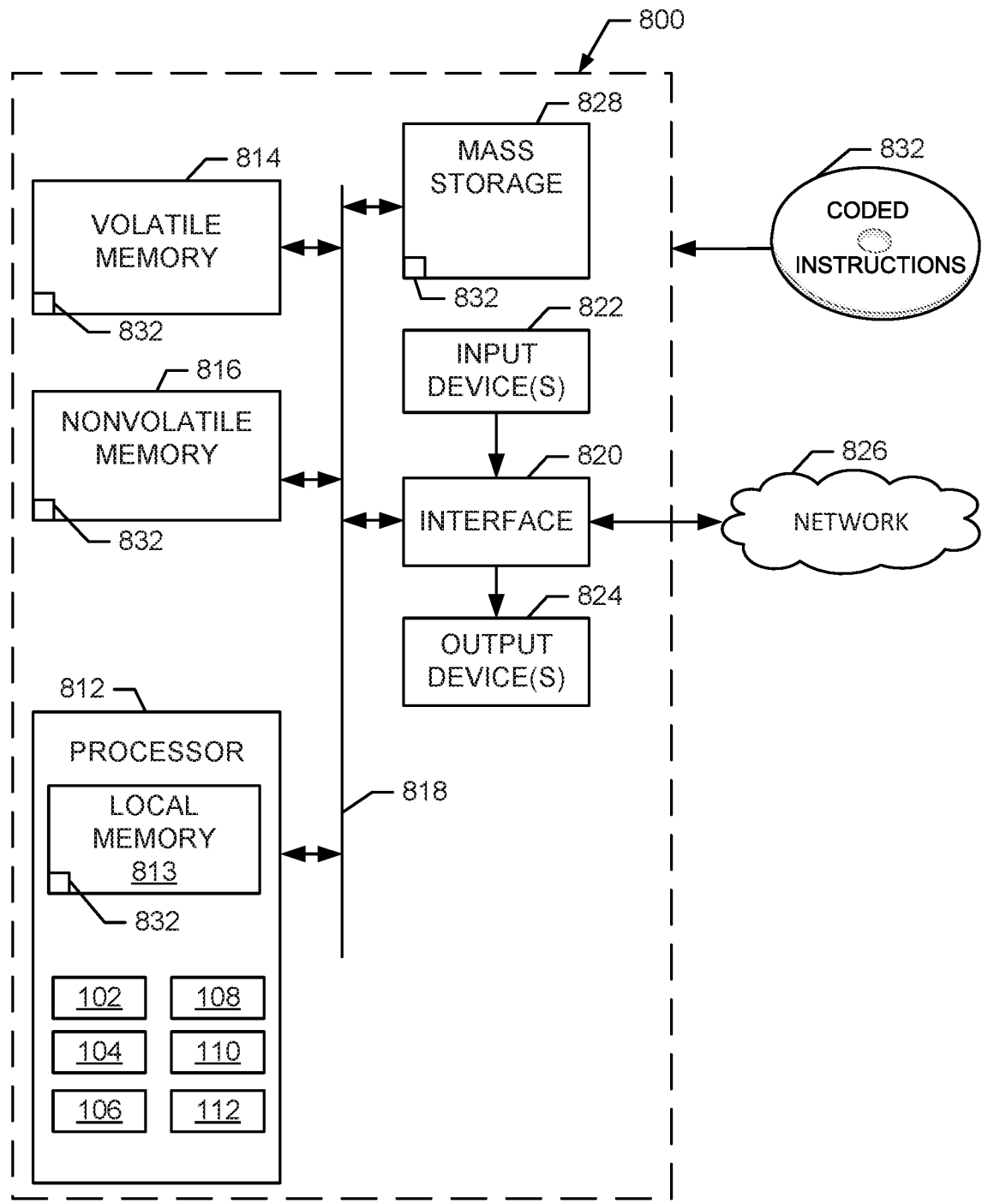
FIG. 8 is a block diagram of an example processing platform structured to execute the instructions of FIGS. 7A and 7B to implement the network switch migrator of FIGS. 1 and 2 to perform VSS-to-VDS migrations in accordance with teachings of this disclosure.

FIG. 8 is a block diagram of an example processor platform 800 structured to execute the instructions of FIGS. 7A and 7B to implement the network switch migrator 100 of FIGS. 1 and 2 to perform VSS-to-VDS migrations 114 (FIGS. 1 and 2). The processor platform 800 can be, for example, a server, a personal computer, a workstation, a self-learning machine (e.g., a neural network), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor 812 may be a semiconductor based (e.g., silicon based) device. In this example, the processor 812 implements the example GUI generator 102, the example user input interface 104, the example VDS creator 106, the example VSS detector 108, the example port group creator 110, and the example configurator 112.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

Machine executable instructions 832 represented by the flow chart of FIGS. 7A and 7B may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that migrate physical server hosts between virtual standard switches and virtual distributed switches in a network. Prior techniques for performing such migrations are tedious as they involve a significant number of steps so that newly instantiated VDS network switches contain the same network configurations of VSS network switches from which physical server hosts are being migrated. For example, the process of creating a VDS and migrating physical server hosts from their VSS to the new VDS is long, consists of many repetitive small tasks, and contains many details which makes such process unclear and highly susceptible to human errors. Examples disclosed herein enable users to create a VDS network switch and distributed port groups to automatically migrate physical server hosts of a cluster to the newly created VDS from VSS network switches in a shorter amount of time and using less-complex user involvement than prior techniques. In this manner, by using examples disclosed herein, physical server hosts and VMs running thereon can continue to operate with little or no interruption which results in higher availabilities of virtual computing resources than prior network switch migration techniques that are prone to configuration errors that could render physical server hosts and/or VMs inoperable for extended durations.

Examples disclosed herein simplify technical aspects of migrating physical server hosts from VSS network switches to VDS network switches. For example, because less user involvement is required, fewer GUIs need to be generated, served, and presented to users to solicit user input. In addition, examples disclosed herein improve the scalability of switch migration operations by automatically accessing existing network configuration settings of VSS network switches for applying to newly created VDS network switches. For example, in a large data center, hundreds of VSS network switches can be migrated faster than prior techniques by collecting fewer network configuration settings from users and instead accessing such network configuration settings from existing configuration files of the VSS network switches. In addition, in some environments, VSS network switches of different models and/or from different manufacturers may be employed. In such situations, prior techniques require users to manually account for differences in network configuration settings between the different models and/or manufacturers when configurating a switch migration. However, using examples disclosed herein, such details can be hidden from users as such different network configuration settings can be obtained directly from existing configuration files of the VSS network switches.

Examples disclosed herein may be used with one or more different types of virtualization environments. Three example types of virtualization environments are: full virtualization, paravirtualization, and OS virtualization. Full virtualization, as used herein, is a virtualization environment in which hardware resources are managed by a hypervisor to provide virtual hardware resources to a VM. In a full virtualization environment, the VMs do not have access to the underlying hardware resources. In a typical full virtualization, a host OS with embedded hypervisor (e.g., a VMWARE® ESXI® hypervisor) is installed on the server hardware. VMs including virtual hardware resources are then deployed on the hypervisor. A guest OS is installed in the VM. The hypervisor manages the association between the hardware resources of the server hardware and the virtual resources allocated to the VMs (e.g., associating physical RAM with virtual RAM). Typically, in full virtualization, the VM and the guest OS have no visibility and/or access to the hardware resources of the underlying server. Additionally, in full virtualization, a full guest OS is typically installed in the VM while a host OS is installed on the server hardware. Example virtualization environments include VMWARE® ESX® hypervisor, Microsoft HYPER-V® hypervisor, and Kernel Based Virtual Machine (KVM).

Paravirtualization, as used herein, is a virtualization environment in which hardware resources are managed by a hypervisor to provide virtual hardware resources to a VM, and guest OSs are also allowed to access some or all the underlying hardware resources of the server (e.g., without accessing an intermediate virtual hardware resource). In a typical paravirtualization system, a host OS (e.g., a Linux-based OS) is installed on the server hardware. A hypervisor (e.g., the XEN® hypervisor) executes on the host OS. VMs including virtual hardware resources are then deployed on the hypervisor. The hypervisor manages the association between the hardware resources of the server hardware and the virtual resources allocated to the VMs (e.g., associating RAM with virtual RAM). In paravirtualization, the guest OS installed in the VM is configured also to have direct access to some or all of the hardware resources of the server. For example, the guest OS may be precompiled with special drivers that allow the guest OS to access the hardware resources without passing through a virtual hardware layer. For example, a guest OS may be precompiled with drivers that allow the guest OS to access a sound card installed in the server hardware. Directly accessing the hardware (e.g., without accessing the virtual hardware resources of the VM) may be more efficient, may allow for performance of operations that are not supported by the VM and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS may be installed in a VM of a full virtualization environment or a paravirtualization environment. The host OS of an OS virtualization system is configured (e.g., utilizing a customized kernel) to provide isolation and resource management for processes that execute within the host OS (e.g., applications that execute on the host OS). Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

In some examples, a data center (or pool of linked data centers) may include multiple different virtualization environments. For example, a data center may include hardware resources that are managed by a full virtualization environment, a paravirtualization environment, and/or an OS virtualization environment. In such a data center, a workload may be deployed to any of the virtualization environments. Examples disclosed herein to migrate physical server hosts between virtual standard switches and virtual distributed switches may be implemented in any one or more of the multiple different virtualization environments.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to migrate a physical server host from a virtual standard switch to a virtual distributed switch, the method comprising:
    obtaining a user-selection of first physical network interface cards of a first physical server host to migrate from the virtual standard switch to the virtual distributed switch;
    generating a proposed migration plan to generate a valid network configuration by modifying a user-provided configuration setting based on a migration rule in response to the user-provided configuration setting not satisfying the migration rule, the proposed migration plan to configure the virtual distributed switch using network configuration settings of the virtual standard switch corresponding to the first physical network interface cards;
    generating a user-approved migration plan based on a user-selection responsive to the proposed migration plan;
    determining whether the user-approved migration plan matches the proposed migration plan; and
    in response to the user-approved migration plan matching the proposed migration plan:
        creating the virtual distributed switch in the first physical server host and a second physical server host, and
        configuring the network configuration settings of the virtual standard switch in the virtual distributed switch.

2. The method as defined in claim 1, further including creating a first port group in the virtual distributed switch based on the proposed migration plan, the first port group to include a first distributed virtual port in the first physical server host and a second distributed virtual port in the second physical server host, the first port group in the virtual distributed switch to match a second port group corresponding to the virtual standard switch.

3. The method as defined in claim 1, further including:
    obtaining user-provided network configuration settings corresponding to a user-selection of a second physical network interface card that is an unused physical network interface card not bound to the virtual standard switch; and
    configuring the virtual distributed switch with the user-provided network configuration settings.

4. The method as defined in claim 1, further including:
    determining that at least one of the first physical network interface cards corresponds to an infrastructure virtual machine;
    accessing second network configuration settings of the at least one of the first physical network interface cards corresponding to the infrastructure virtual machine from the virtual standard switch; and
    configuring the second network configuration settings in the virtual distributed switch.

5. The method as defined in claim 1, further including:
    determining that a second physical network interface card selected to migrate to the virtual distributed switch corresponds to a second virtual standard switch separate from the virtual standard switch; and
    accessing the network configuration settings of the virtual standard switch to configure the network configuration settings in the virtual distributed switch for the first physical network interface cards and the second physical network interface card when the network configuration settings are the same for the virtual standard switch and the second virtual standard switch.

6. The method as defined in claim 1, wherein the user-selection is to proceed with migration from the virtual standard switch to the virtual distributed switch.

7. A non-transitory computer readable storage medium comprising instructions that, when executed, cause one or more processors to at least:
    obtain a user-selection of first physical network interface cards of a first physical server host to migrate from a virtual standard switch to a virtual distributed switch;
    generate a proposed migration plan to generate a valid network configuration by modifying a user-provided configuration setting based on a migration rule in response to the user-provided configuration setting not satisfying the migration rule, the proposed migration plan to configure the virtual distributed switch using network configuration settings of the virtual standard switch corresponding to the first physical network interface cards;
    generate a user-approved migration plan based on a user-selection responsive to the proposed migration plan;
    determine whether the user-approved migration plan matches the proposed migration plan; and
    in response to the user-approved migration plan matching the proposed migration plan:
        create the virtual distributed switch in the first physical server host and a second physical server host, and
        configure the network configuration settings of the virtual standard switch in the virtual distributed switch.

8. The non-transitory computer readable storage medium as defined in claim 7, wherein the instructions are further to cause the one or more processors to create a first port group in the virtual distributed switch based on the proposed migration plan, the first port group to include a first distributed virtual port in the first physical server host and a second distributed virtual port in the second physical server host, the first port group in the virtual distributed switch to match a second port group corresponding to the virtual standard switch.

9. The non-transitory computer readable storage medium as defined in claim 7, wherein the instructions are further to cause the one or more processors to:
    obtain user-provided network configuration settings corresponding to a user-selection of a second physical network interface card that is an unused physical network interface card not bound to the virtual standard switch; and
    configure the virtual distributed switch with the user-provided network configuration settings.

10. The non-transitory computer readable storage medium as defined in claim 7, wherein the instructions are further to cause the one or more processors to:
    generate a migration selection graphical user interface; and
    obtain a user-selection indicating a request to migrate the virtual standard switch to the virtual distributed switch.

11. The non-transitory computer readable storage medium as defined in claim 7, wherein the instructions are further to cause the one or more processors to:

determine that at least one of the first physical network interface cards corresponds to an infrastructure virtual machine;

access second network configuration settings of the at least one of the first physical network interface cards corresponding to the infrastructure virtual machine from the virtual standard switch; and configure the second network configuration settings in the virtual distributed switch.

12. The non-transitory computer readable storage medium as defined in claim 7, wherein the instructions are further to cause the one or more processors to:

determine that a second physical network interface card selected to migrate to the virtual distributed switch corresponds to a second virtual standard switch separate from the virtual standard switch; and access the network configuration settings of the virtual standard switch to configure the network configuration settings in the virtual distributed switch for the first physical network interface cards and the second physical network interface card when the network configuration settings are the same for the virtual standard switch and the second virtual standard switch.

13. The non-transitory computer readable storage medium as defined in claim 7, wherein the user-selection is to proceed with migration from the virtual standard switch to the virtual distributed switch.

14. An apparatus to migrate a physical server host from a virtual standard switch to a virtual distributed switch, the apparatus comprising:

a user input interface to obtain a user-selection of first physical network interface cards of a first physical server host to migrate from the virtual standard switch to the virtual distributed switch;

a configurator to:

generate a proposed migration plan to generate a valid network configuration by modifying a user-provided configuration setting based on a migration rule in response to the user-provided configuration setting not satisfying the migration rule, the proposed migration plan to configure the virtual distributed switch using network configuration settings of the virtual standard switch corresponding to the first physical network interface cards;

generate a user-approved migration plan based on a user-selection responsive to the proposed migration plan; and determine whether the user-approved migration plan matches the proposed migration plan; and a virtual distributed switch creator to, in response to the user-approved migration plan matching the proposed migration plan, create the virtual distributed switch in the first physical server host and a second physical server host, the configurator to configure the network configuration settings of the virtual standard switch in the virtual distributed switch.

15. The apparatus as defined in claim 14, further including a port group creator to create a first port group in the virtual distributed switch based on the proposed migration plan, the first port group to include a first distributed virtual port in the first physical server host and a second distributed virtual port in the second physical server host, the first port group in the virtual distributed switch to match a second port group corresponding to the virtual standard switch.

16. The apparatus as defined in claim 14, wherein the user input interface is to obtain user-provided network configuration settings corresponding to a user-selection of a second physical network interface card that is an unused physical network interface card not bound to the virtual standard switch, and the configurator is to configure the virtual distributed switch with the user-provided network configuration settings.

17. The apparatus as defined in claim 14, further including a graphical user interface generator to generate a migration selection graphical user interface, the user input interface to obtain a user-selection indicating a request to migrate the virtual standard switch to the virtual distributed switch.

18. The apparatus as defined in claim 14, wherein the configurator is to:

determine that at least one of the first physical network interface cards corresponds to an infrastructure virtual machine;

access second network configuration settings of the at least one of the first physical network interface cards corresponding to the infrastructure virtual machine from the virtual standard switch; and configure the second network configuration settings in the virtual distributed switch.

19. The apparatus as defined in claim 14, further including a virtual standard switch detector to determine that a second physical network interface card selected to migrate to the virtual distributed switch corresponds to a second virtual standard switch separate from the virtual standard switch, and the configurator is to access the network configuration settings of the virtual standard switch to configure the network configuration settings in the virtual distributed switch for the first physical network interface cards and the second physical network interface card when the network configuration settings are the same for the virtual standard switch and the second virtual standard switch.

20. The apparatus as defined in claim 14, wherein the the user-selection is to proceed with migration from the virtual standard switch to the virtual distributed switch.

* * * * *